Jan. 19, 1971     HAJIME ONODA ET AL     3,555,902

FLOW METER

Filed Sept. 11, 1968     2 Sheets-Sheet 1

United States Patent Office 3,555,902
Patented Jan. 19, 1971

3,555,902
FLOW METER
Hajime Onoda and Akihumi Yahiro, Tokyo, Japan, assignors to Kimmon Manufacturing Co., Ltd., Tokyo, Japan, a corporation of Japan
Filed Sept. 11, 1968, Ser. No. 759,143
Claims priority, application Japan, Mar. 9, 1968, 43/18,160
Int. Cl. G01f 1/06
U.S. Cl. 73—229                              4 Claims

ABSTRACT OF THE DISCLOSURE

This flow meter includes means for dynamically converting the flow of a fluid passing through a path provided therein to the revolution of a geared rotary crank shaft of a measuring section; a pulse generator having an induction coil, movable magnet core and rapidly reciprocating member associated with the magnet core and urged by the resilient action of a spring; means for intermittently engaging the reciprocating member with the geared rotary crank shaft so as to accumulate, while the reciprocating member is interlocked with the geared crank shaft. Kinetic energy is produced resulting from the rotation of the geared crank shaft in the reciprocating member in accordance with the increasing magnitude of said shaft rotation against the spring action and the kinetic energy is produced at the moment said interlocking is released, producing pulses. A counter measures the pulses supplied by the generator.

---

This invention relates to a flow meter capable of digitally indicating the flow rate of a fluid at a remote place from the measuring section, wherein the flow rate of the fluid is dynamically converted to the revolution of a rotary shaft.

The prior art flow meter had an electrical circuit including a switch to be closed for each rotation of the rotor. However, such flow meter unavoidably had to be provided with a power source, and was handicapped by the drawback that the switch often failed to be actuated due to the burning of the contacts thereof.

An object of this invention is to provide an improved flow meter not having the aforementioned drawbacks encountered in the prior art flow meters and capable of digitally indicating the flow rate of a fluid at a place remote from the measuring section at the same time that the fluid is introduced.

In an aspect of this invention, the flow meter includes means for dynamically converting the flow of a fluid passing through a path provided therein to the revolution of a geared rotary crank shaft of the measuring section; a pulse generator having an induction coil, movable magnet core and rapidly reciprocating member associated with the magnet core and urged by the resilient action of a spring; means for intermittently engaging the reciprocating member with the geared rotary crank shaft so as to accumulate, while the reciprocating member is interlocked with the geared crank shaft. Kinetic energy results from the rotation of the geared crank shaft in the reciprocating member in accordance with the increasing magnitude of said shaft rotation against the spring action and the kinetic energy is discharged at the moment said interlocking is released producing pulses. A counter measures the pulses supplied by the generator.

Figure 1:
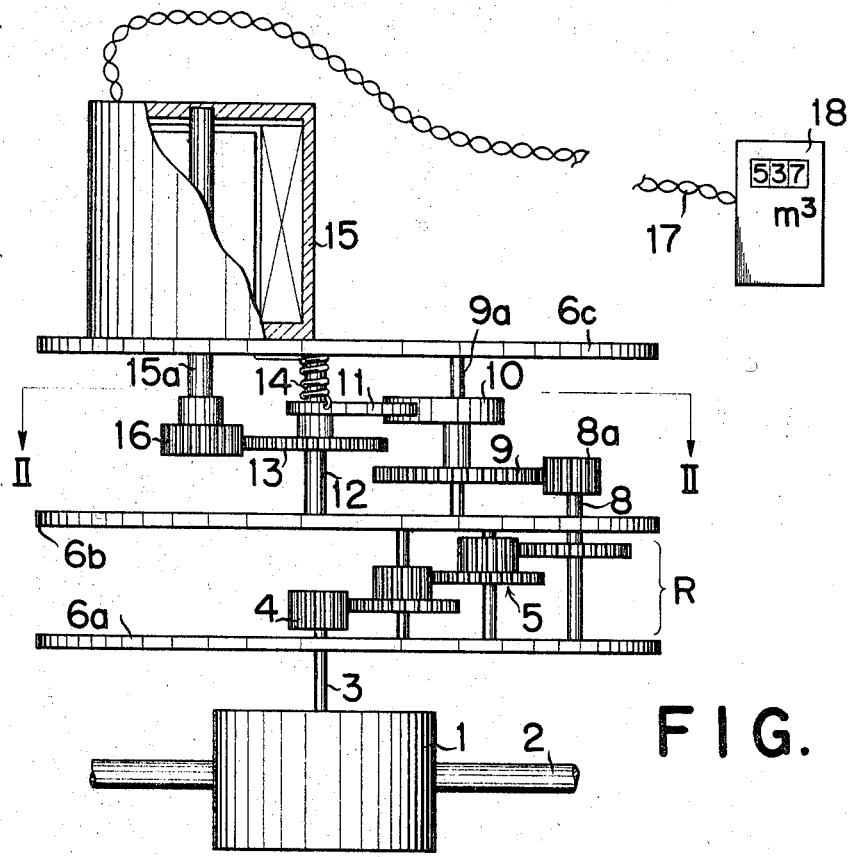
FIG. 1 is a diagrammatical side view of an embodiment of the flow meter of this invention.
Figure 2:
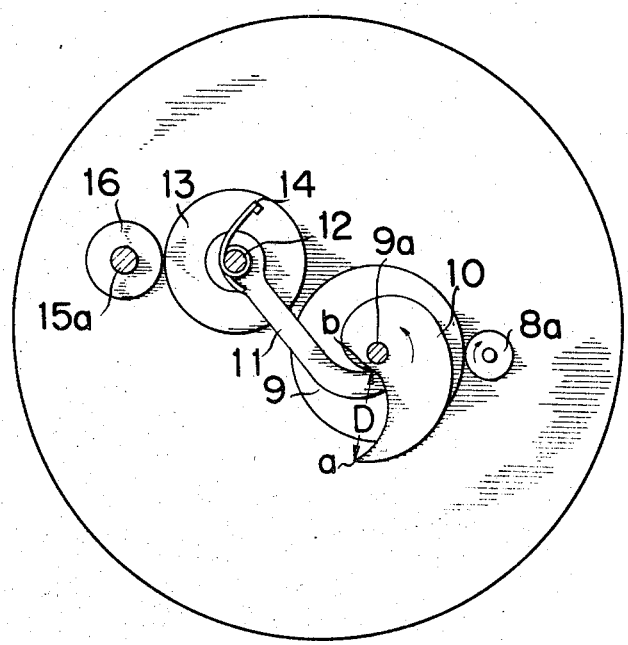
FIG. 2 is a perspective view along line II—II of FIG. 1.

There will now be described the illustrated three aspects of the present invention, including two embodiments and one modification. There will first be explained the embodiment jointly indicated by FIGS. 1 to 3. Numeral 1 is a waterproof measuring device installed in a fluid path for measuring the flow rate of a fluid. This measuring device comprises a measuring membrane reciprocating in accordance with the volumes of gas passing therethrough to thereby determine said gas flow rate. The flow meter is so designed as to cause the measured gas flow to be converted to a rotating energy through a rotary crank shaft 3 for subsequent transmission to the outside. The end of the crank shaft 3 is allowed to extend into the gear system chamber R. A gear 4 fitted to said end is engaged with a reduction gear mechanism 5 so as to be interlocked therewith. The reduction gear mechanism 5 reduces the transmitted rotation to a prescribed rotational velocity. A gear 8a fitted to a reduction gear shaft 8 extending above a partition plate 6b is engaged with a drive gear 9. To a measuring drive axle 9a, to which is journaled the drive gear 9, is fitted a comma-shapped measuring cam 10. This measuring cam 10 has an outer periphery so formed as to define a curve around the measuring drive axle 9a and an arched inner periphery which extends from the cam base to the outermost cam end a, as viewed from the measuring drive axle 9a, said cam end being spaced at a prescribed distance D from the cam base. The measuring cam 10 is allowed to rotate about the measuring drive axle 9a in the direction indicated by the arrow.

A lever 11 sliding over the peripheral surface of the measuring cam 10 as a result of its rotation is also arranged to rotate jointly with a drive gear 13 rotatably journaled to a fixed axle 12. One end of a coiled spring 14 wound about the fixed axle 12 is fitted to the upper frame 6c of a box member 6 and the other end of the coiled spring 14 is engaged with the lever 11 so as to cause the lever 11 to be always pressed to direction of the measuring drive axle 9a. The drive gear 13 is engaged with a gear 16 having a much smaller diameter than the drive gear 13 and journaled to the rotor axle 15a of a generator 15. The output terminal of the generator through a lead wire 17 to a magnetic count indicating mechanism 18 located at a remote place from the generator 15.

Figure 3:
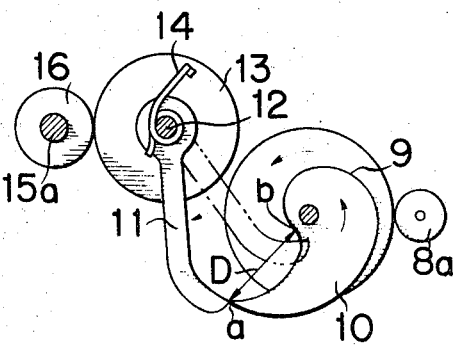
FIG. 3 is the same perspective view as that of FIG. 2 showing the condition of the measuring section of the flow meter just before releasing the accumulated energy.

With a flow meter of the aforesaid arrangement, where, for example, a gas flows through the measuring section of a gas meter placed in a fluid path, the measuring section measures the flow rate of the gas, converts it to a rotating energy with the resultant rotation of the cam axle 3. The rotation of the cam axle 3 is reduced to a prescribed velocity by the reduction gear mechanism 5, so as to rotate the drive gear 9 at a workable velocity. The resultant rotation of the drive axle 9a causes the measuring cam 10 journaled thereto to be rotated also at a prescribed velocity. In accordance with the rotation of the measuring cam 10, the lever 11 rotates against the pressing force of the coiled spring 14 through a prescribed angle, namely, as shown in FIG. 3, only through that angle which corresponds to the distance D between the end *a* of the measuring cam 10 and the base point *b* of the cam 10. Thus the rotating energy of the cam 10 is accumulated in the coiled spring 14. Upon further rotation of the measuring cam 10, the lever 11 is detached from the end *a* of the cam 10. Then the righting moment of the coiled spring 14, namely, the accumulated rotating energy is released to cause the lever 11 to be instantly rotated only to that extent corresponding to the head D. This leads to the simultaneous rapid rotation of the drive gear 13 with the lever 11, causing the resultant momentary rotation of the gear 16 of the generator 15 and generation of one output pulse (impact voltage) therefrom. This output is counted and indicated by a remotely located counting mechanism 18 such as an electromagnetic counter. Reading of the counts of output pulses issued by the generator 15 per rotation of the measuring cam 10 makes it possible easily to find the flow rate or consumption of gas at a remote place from the fluid measuring section.

Moreover, the peripheral edge of the measuring cam 10 which the lever 11 slidably contacts forms a curve, so that the lever 11 is turned along the curve with its rotating torque maintained constant. This allows for the very smooth rotation of the cam 10, with the resultant accurate measurement of the flow rate of a fluid. Also reduction of the rotating velocity of the measuring cam 10 minimizes head loss in the flow rate measuring section, thus enabling measurement to be carried out with great certainty and larger drive energies to be applied to the generator 15 by providing a more forceful coiled spring. Further, the generator disposed in the flow rate measuring section concurrently actuates a count indicator of measured flow rates by its output pulses, so that where counted flow rates are to be read at a remote place, there is no need to impress any additional voltage from the outside. This enables a flow meter to have an extremely simple construction, requirements of check and maintenance to be considerably reduced and the flow rate of a fluid to be accurately determined.

There will now be described another embodiment of FIG. 4. A vane wheel positioned in a fluid path buried in the ground or the like is rotatably journaled to the interior of a box member 102 housing, for example, a measuring mechanism. A rotary axle 103 jointly rotating with the vane wheel 101 is interlocked by engagement, for example, with a reduction gear mechanism 104 enclosed in a gear system chamber of waterproof construction. To the end of a rotary drive axle 105 rotated at a prescribed reduced velocity by the reduction gear mechanism 104 is journaled a pinion 106 provided with a segmental gear 107. An energy accumulating member 109 having a rack interlocking with the gear 107 of the pinion 106 is integrally provided at one end with a magnet 110. To one end of the magnet 110 is fitted a spring 111 for reciprocation of the energy accumulating member 109, thus finishing the construction of the energy accumulating mechanism. The magnet 110 integrally fitted to the energy accumulator 109 thus constructed is allowed to reciprocate through a measuring coil 112 to constitute a measuring and converting mechanism. This measuring and converting mechanism can be positioned at such a place as will present difficulties in determining the flow rate of a fluid passing, for example, underground. In this case the measuring and converting mechanism is electrically connected through a lead wire to a count indicating mechanism 113 remotely located from the measuring coil 112 to form a complete flow meter. With such an arrangement, the rotating energy of the vane wheel rotating in proportion to the flow rate of a fluid running through a fluid path is reduced to a prescribed extent by the reduction gear mechanism 104 to be transmitted to the rotary drive axle 105. Thus the pinion 106 journaled to the rotary drive axle 105 is also caused to rotate at a prescribed velocity with the gear 107 of the pinion 106 engaged with the rack 108 of the energy accumulator 109. Consequently the energy accumulator 109 is gently pulled away outward against the force of the reciprocation spring 111, thus progressively accumulating the rotating energy of the pinion with the increasing angle of said rotation. When the pinion 106 rotates through a prescribed angle, the rack 108 of the energy accumulator 109 which has been pulled away to a prescribed extent is instantly detached from the pinion gear 107 to cause the energy accumulator 109 to be brought back to its original position by the force of the reciprocation spring 111, the reciprocation of the accumulator 109 being repeated each time the pinion 106 travels through a prescribed angle. At this time the magnet 110 fitted to the end of the energy accumulator 109 rapidly passes through the measuring coil 112, generating a momentary pulsated electric energy therein. The pulsated electric energy is counted by the count indicating mechanism 113 to measure the flow rate of a fluid running through the fluid path. After each rotation of the pinion 106 through a prescribed angle, the pinion gear 107 and the rack 108 of the energy accumulator 109 are again engaged with each other, bringing the energy accumulator 109 back to its prescribed original position and leaving it ready for a succeeding reciprocating cycle. As described above, the process of generating a pulsated electric energy is repeated by the measuring coil 112 and with the count indicating mechanism 113 counting and indicating the electric energy.

Figure 4:
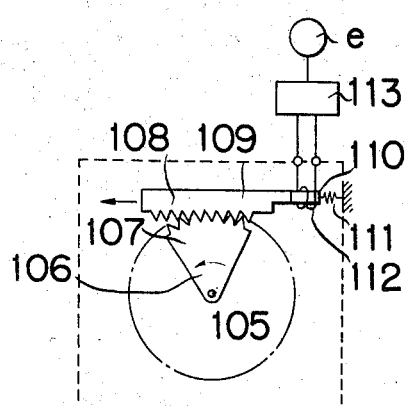
FIG. 4 represents another embodiment of the invention, the upper half of the figure being a diagrammatic plan view and the lower half being a longitudinal sectional view.
Figure 4:
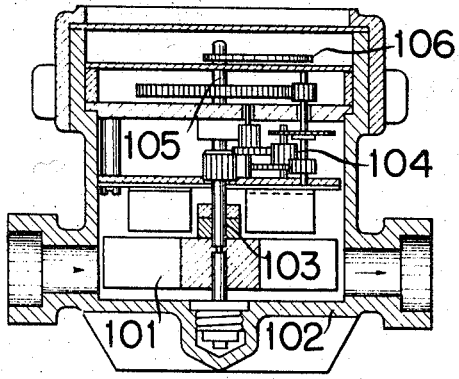
Figure 5:
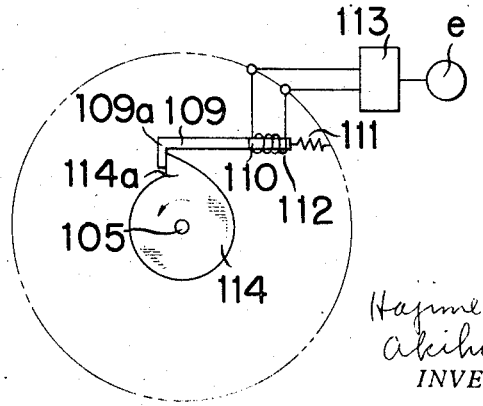
FIG. 5 is a plan view of a modification of the embodiment of FIG. 4.

The embodiment of FIG. 5 represents the case where only the means for accumulating the rotating energy has been modified from that shown in FIG. 4. To describe briefly with the same parts of FIG. 5 as those of FIG. 4 denoted by the same numerals, there is journaled to the rotary drive axle 105 a cam 114 formed as illustrated, and there is provided an energy accumulator 109 having its bent end 115*a* interlocked with the engaging protuberance 114*a* of the cam 114. Such arrangement similarly enables a pulsated electric energy to be unfailingly produced and counted by the aforesaid count indicator thereby to assure the accurate measurement of a fluid flow.

The present invention is not restricted by the aforementioned embodiments, but permits the use of any kind of energy accumulator, for example, a fork lift type or cam type, provided it can accumulate a prescribed amount of energy and intermittently generate a pulsated electric energy by instantly releasing the accumulated energy.

As mentioned above, where the flow rate of a fluid running through a fluid path is to be measured, the present invention consists in accumulating the rotating energy of a rotary member included in a measuring section, instantly releasing the accumulated energy the moment it reaches a prescribed value, thereby to generate a pulsated electric energy and counting the energy by a proper counting means. Consequently the invention enables the flow rate of a fluid to be measured and indicated with great ease and accuracy by a simple construction without externally supplying any extra voltage at a remote place from the measuring section.

What is claimed is:
1. A flow meter, comprising:
 (a) conversion means including a measuring section having a geared rotary shaft and rotary means for dynamically converting the flow of a liquid passing along a path to a function of the revolution of said shaft;
 (b) a pulse generator including an induction coil therein, a moveable magnet core in said coil, a rapidly reciprocatable member coupled to said magnet core, a spring biasing said rapidly reciprocatable member;
 (c) engaging means coupled to the geared rotary shaft intermittently engaging the reciprocatable member with the geared rotary shaft, moving said reciprocatable member against said spring bias so as to accumulate energy while said reciprocatable member is engaged with said gear shaft, the energy resulting from the rotation of the geared shaft engaging the reciprocatable member corresponding to the increasing magnitude of the shaft rotation against the biasing action of said spring, while discharging the energy at the moment said engagement is released; and, (d) counter means coupled to said pulse generator for measuring the pulses supplied by said generator.

2. A flow meter claimed in claim 1, said reciprocatable member being directly connected to said magnet core, said magnet core moving longitudinally in said induction coil.

3. A flow meter claimed in claim 1 in which the rapidly reciprocatable member is rotated about its axis.

4. A flow meter claimed in claim 1 in which the intermittently engaging means includes a rotary cam with the geared shaft and a hook member mounted on the reciprocatable member.

References Cited

UNITED STATES PATENTS

| | | | |
|---|---|---|---|
| 2,991,652 | 7/1961 | Bassett | 73—229 |
| 3,093,973 | 6/1963 | Williams | 73—229 |
| 3,101,615 | 8/1963 | Pavone | 73—231 |

JAMES J. GILL, Primary Examiner

H. GOLDSTEIN, Assistant Examiner